United States Patent
Schaaf

(10) Patent No.: US 10,625,893 B2
(45) Date of Patent: Apr. 21, 2020

(54) DEVICE FOR PROCESSING, IN PARTICULAR FOR ULTRASOUND WELDING, OF PACKAGING SLEEVES

(71) Applicant: SIG Technology AG, Neuhausen am Rheinfall (CH)

(72) Inventor: Michael Schaaf, Herzogenrath (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 149 days.

(21) Appl. No.: 15/739,860

(22) PCT Filed: Jun. 7, 2016

(86) PCT No.: PCT/EP2016/062832
§ 371 (c)(1),
(2) Date: Dec. 26, 2017

(87) PCT Pub. No.: WO2017/001153
PCT Pub. Date: Jan. 5, 2017

(65) Prior Publication Data
US 2018/0362201 A1    Dec. 20, 2018

(30) Foreign Application Priority Data

Jun. 29, 2015    (DE) .................. 10 2015 110 387

(51) Int. Cl.
*B32B 37/00* (2006.01)
*B65B 51/22* (2006.01)
(Continued)

(52) U.S. Cl.
CPC .......... *B65B 51/225* (2013.01); *B29C 65/087* (2013.01); *B29C 65/7841* (2013.01);
(Continued)

(58) Field of Classification Search
CPC ... B29C 65/08; B29C 65/087; B29C 65/7841; B29C 66/1122; B29C 66/135;
(Continued)

(56) References Cited

U.S. PATENT DOCUMENTS

| 3,272,682 A | 9/1966 | Balamuth et al. |
| 3,294,616 A | 12/1966 | Linsley et al. |

(Continued)

FOREIGN PATENT DOCUMENTS

| DE | 10231742 B3 | 1/2004 |
| DE | 10331064 A1 | 2/2005 |

(Continued)

*Primary Examiner* — James D Sells
(74) *Attorney, Agent, or Firm* — The Webb Law Firm

(57) ABSTRACT

A device for processing, in particular for ultrasound welding, of packaging sleeves and/or packagings includes at least two tools for processing, in particular for ultrasound welding, of packaging sleeves. Each tool has an operating region. The tools are supported in such a manner that there is produced between the operating regions a gap whose longitudinal direction corresponds to the transport direction of the packaging sleeves, and the tools are supported in such a manner that the size of the gap can be changed. In order also to enable continuous welding of the packaging sleeves in a reliable manner with changing material thicknesses, there is provided at least one parallel spring on which at least one of the tools is movably supported transversely relative to the transport direction of the packaging sleeves.

15 Claims, 7 Drawing Sheets

(51) Int. Cl.

| | |
|---|---|
| *B29C 65/08* | (2006.01) |
| *B29C 65/00* | (2006.01) |
| *B65B 51/16* | (2006.01) |
| *B65B 7/18* | (2006.01) |
| *B29C 65/78* | (2006.01) |
| *B31B 50/64* | (2017.01) |
| *B65D 5/06* | (2006.01) |
| *B29L 31/00* | (2006.01) |
| *B31B 110/35* | (2017.01) |
| *B31B 100/00* | (2017.01) |
| *B31B 50/06* | (2017.01) |

(52) U.S. Cl.
CPC ........ *B29C 66/112* (2013.01); *B29C 66/1122* (2013.01); *B29C 66/135* (2013.01); *B29C 66/346* (2013.01); *B29C 66/43122* (2013.01); *B29C 66/8161* (2013.01); *B29C 66/81611* (2013.01); *B29C 66/83413* (2013.01); *B29C 66/849* (2013.01); *B31B 50/644* (2017.08); *B31B 50/649* (2017.08); *B65B 7/18* (2013.01); *B65B 51/16* (2013.01); *B65D 5/064* (2013.01); *B29L 2031/7166* (2013.01); *B31B 50/06* (2017.08); *B31B 2100/0022* (2017.08); *B31B 2110/35* (2017.08)

(58) Field of Classification Search
CPC ............ B29C 66/346; B29C 66/43122; B29C 66/81611; B29C 66/83413; B65B 51/225; B65B 7/18; B65B 51/16
USPC ...................................................... 156/580.1
See application file for complete search history.

(56) References Cited

U.S. PATENT DOCUMENTS

| | | |
|---|---|---|
| 3,863,826 A | 2/1975 | Shoh |
| 6,547,903 B1 | 4/2003 | McNichols et al. |
| 2004/0050474 A1 | 3/2004 | Kubik et al. |
| 2006/0144904 A1 | 7/2006 | Mlinar et al. |
| 2006/0169387 A1 | 8/2006 | Nayar et al. |
| 2009/0289528 A1 | 11/2009 | Voss |
| 2012/0073762 A1 | 3/2012 | Ippers et al. |
| 2015/0306816 A1 | 10/2015 | Herrmann |

FOREIGN PATENT DOCUMENTS

| | | |
|---|---|---|
| DE | 102013100474 A1 | 7/2014 |
| EP | 1455957 A1 | 9/2004 |
| EP | 2416940 A1 | 2/2012 |
| WO | 2006074031 A1 | 7/2006 |
| WO | 2008037256 A2 | 4/2008 |
| WO | WO 2008/059352 * | 5/2008 |

\* cited by examiner

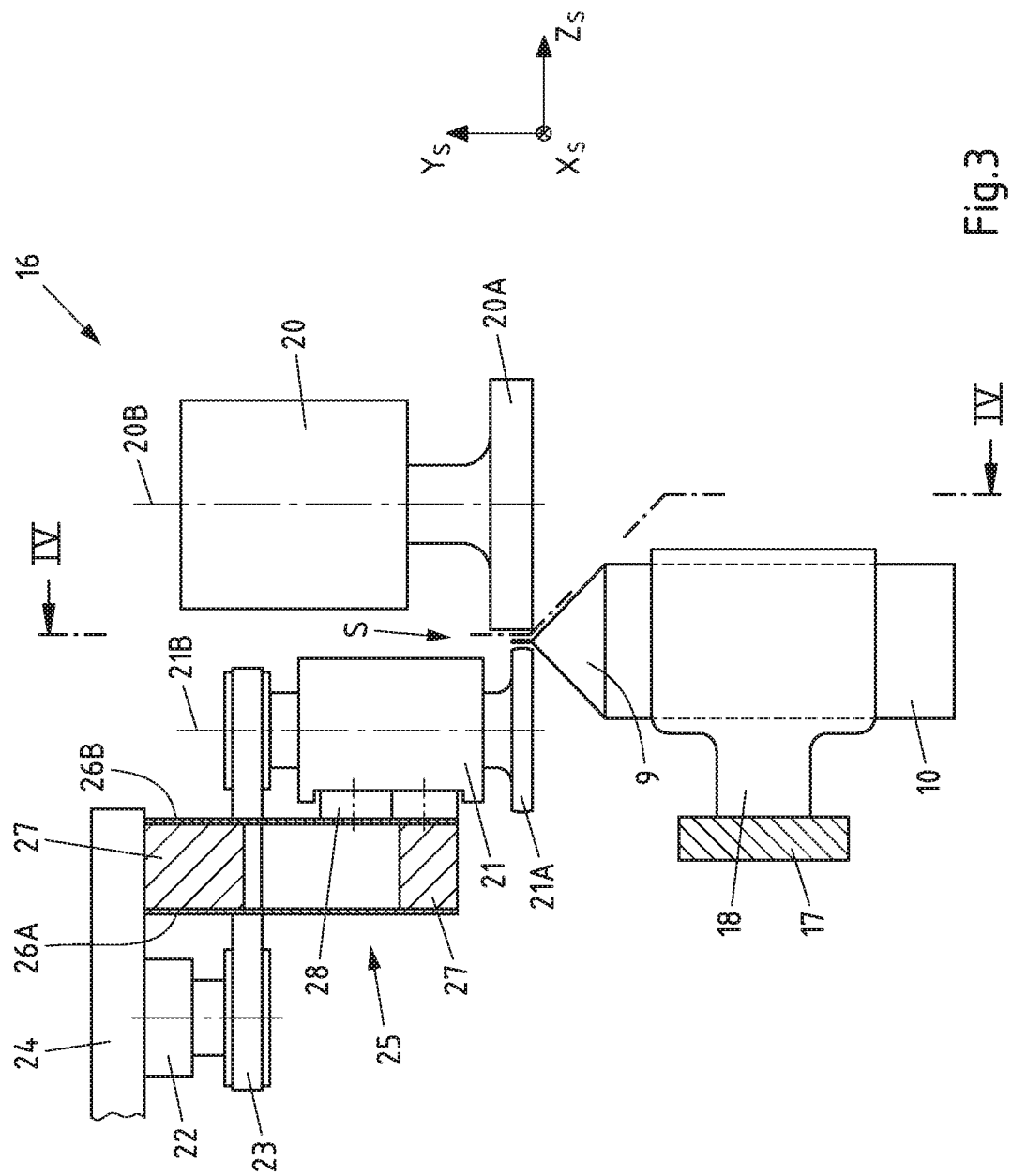

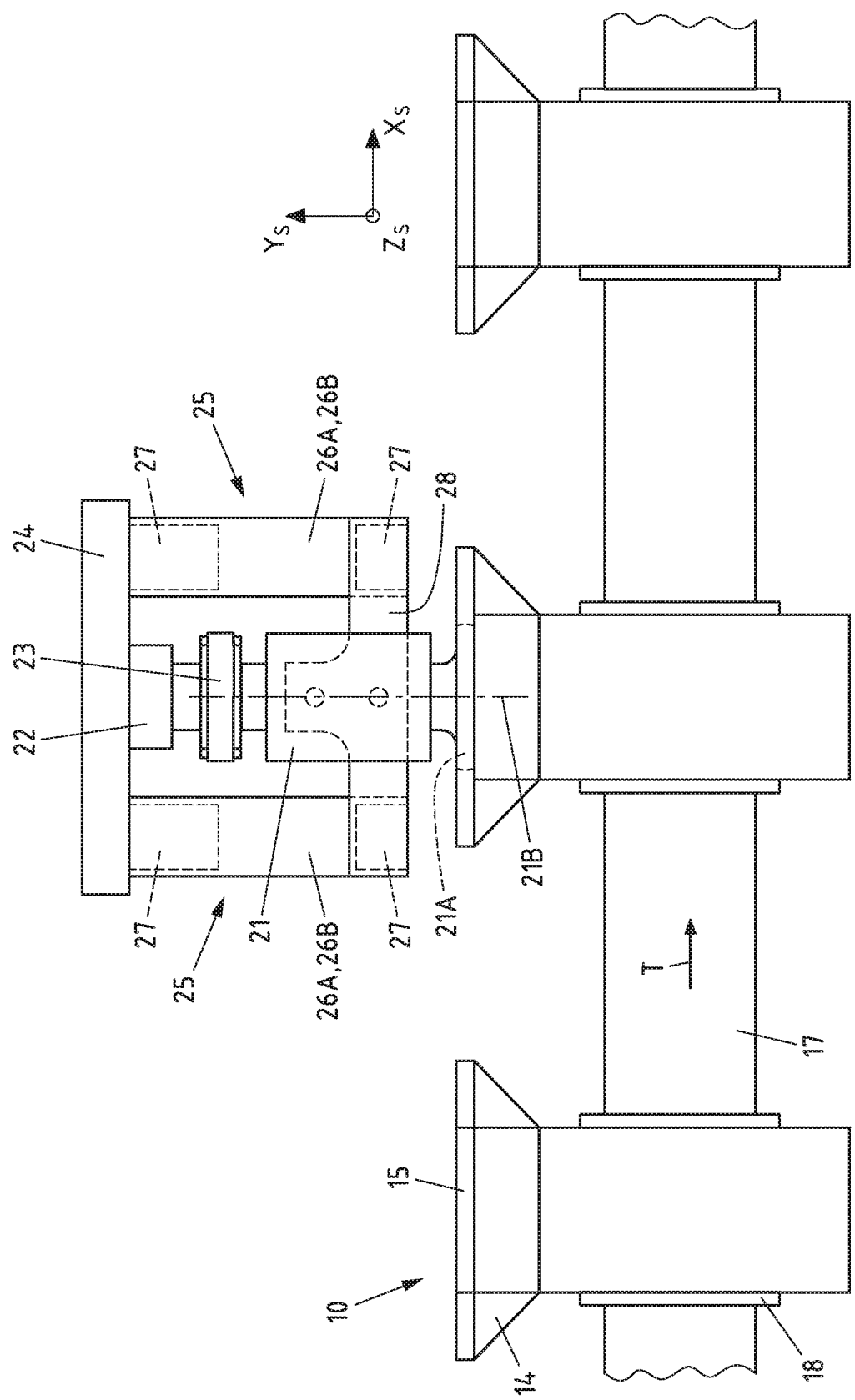

DEVICE FOR PROCESSING, IN PARTICULAR FOR ULTRASOUND WELDING, OF PACKAGING SLEEVES

CROSS-REFERENCE TO RELATED APPLICATIONS

This application is the United States national phase of International Application No. PCT/EP2016/062832 filed Jun. 7, 2016, and claims priority to German Patent Application No. 10 2015 110 387.7 filed Jun. 29, 2015, the disclosures of which are hereby incorporated in their entirety by reference.

BACKGROUND OF THE INVENTION

Field of the Invention

The invention relates to a device for processing, in particular for ultrasound welding, of packaging sleeves and/or packagings, comprising: at least two tools for processing, in particular for ultrasound welding, of packaging sleeves, wherein each tool has an operating region, wherein the tools are supported in such a manner that there is produced between the operating regions a gap whose longitudinal direction corresponds to the transport direction of the packaging sleeves, and wherein the tools are supported in such a manner that the size of the gap can be changed.

The invention further relates to the use of such a device for processing, in particular for welding, of packaging sleeves and/or packagings for foodstuffs.

Description of Related Art

Packagings can be produced in different manners and from extremely different materials. A widely used possibility for the production thereof involves producing from the packaging material a blank from which by means of folding and other steps initially a packaging sleeve and finally a packaging are produced. This type of production has inter alia the advantage that the blanks are very flat and can consequently be stacked in a space-saving manner. In this manner, the blanks or packaging sleeves can be produced at a different location from that at which the folding and filling of the packaging sleeves are carried out. Composite materials are often used as the material, for example, a composition of a plurality of thin layers of paper, cardboard, plastics material and/or metal, in particular aluminium. Such packagings are widely used, in particular in the food industry.

In the field of packaging technology, there are known numerous devices and methods by means of which flat-folded packaging sleeves can be folded up, closed at one side, filled with contents and subsequently completely closed.

A particular challenge involves the closing of the packaging sleeves since, as a result of the closure, a reliable sealing of the packaging sleeves has to be achieved and also has to withstand the subsequent transport and other loads. One possibility for closure of packaging sleeves is welding the seams of the packaging sleeve. This may be carried out, for example, by means of ultrasound welding methods. To this end, two tools which rotate in opposing directions, a sonotrode and an anvil, are often arranged in such a manner that a narrow gap is produced between the substantially cylindrical operating regions of these tools. The packaging sleeves can now be guided through this gap with the region thereof which is intended to be welded.

The welding operation is carried out by the sonotrode transmitting its ultrasound oscillations to the region of the packaging sleeve which is intended to be welded. To this end, there is required a specific pressing force which is dependent on the structure and the thickness of the material to be welded and the contact zones on the anvil and the sonotrode and the adjusted frequency and which is achieved, for example, by the width of the gap being adjusted to be narrower than the material thickness of the regions of the packaging sleeves which are intended to be welded. The energy applied to the packaging sleeve in this manner leads to melting and adhesion ("welding") of the inner material layer which is often a layer of thermoplastic plastics material.

Devices and methods for ultrasound welding of thin materials are known, for example, from EP 1 455 957 A1, WO 2008/037256 A2, EP 2 416 940 A1 and DE 10 2013 100 474 A1.

The ultrasound welding methods described therein have as a result of the rotating tools the advantage that a continuous welding can be carried out. The material which is intended to be welded can thus be guided through the ultrasound welding installation in an interruption-free manner. In addition, with many of the known devices, the gap width between the tools can be adjusted in an active manner—that is to say, by the user of the installation—and consequently adapted to the thickness of the materials to be welded.

However, a disadvantage of the known devices and methods is that a passive adaptation—that is to say, actuated by the material to be welded—of the gap width during the welding operation is not possible at all or possible only in an unsatisfactory manner. A change of the gap width during the welding operation may be necessary, for example, when a plurality of materials to be welded are guided through the gap not in a state seamlessly arranged beside each other, but instead spaced apart from each other. This may be the case, for example, with packaging sleeves which are moved along by a conveyor belt. A change of the gap width may also be necessary when the material thickness of the materials to be welded changes. This may also occur with packaging sleeves, for example, in the region of overlapping material layers.

SUMMARY OF THE INVENTION

Against this background, an object of the invention is to configure and develop a device described in the introduction and explained in greater detail above in such a manner that a processing, in particular a continuous welding, of packaging sleeves is also possible in a reliable manner with changing material thicknesses.

This object is achieved with a device by means of at least one parallel spring on which at least one of the tools is movably supported transversely relative to the transport direction of the packaging sleeves.

A device according to the invention for processing, in particular for ultrasound welding, of packaging sleeves and/or packagings is distinguished firstly by at least two tools which serve to process, in particular to ultrasound weld, packaging sleeves. With two or more tools being provided, the packaging sleeves can be processed at the same time from several sides without having to be turned for this purpose. Each tool has an operating region, which is intended to be understood to be the region which acts on the packaging sleeves and/or packagings. The action of the operating regions on the packaging sleeve may be carried out in a contactless manner (for example, by means of radiation) or with contact (for example, by means of pressure). The tools are supported in such a manner that there is produced between the operating regions a gap whose longitudinal direction corresponds to the transport direction of the packaging sleeves. By the direction of the gap being adapted to the transport direction of the packaging sleeves, the packaging sleeves can be processed by the tools without having to change the movement direction thereof for this purpose. Since the tools are arranged at both sides of a gap and consequently opposite each other, it is additionally possible for both sides of the packaging sleeves to be processed at the same time. The tools are supported in such a manner that the size of the gap can be changed. This may be intended to be understood in particular to be an "active" adjustment of the gap—that is to say, initiated by the user of the device. This adjustment is generally carried out when the device is in the stopped state, for example, when the material which is intended to be processed is being changed. The gap width is, in the unloaded state of the parallel spring, preferably in the range between 0.1 mm and 1.5 mm, in particular between 0.2 mm and 0.8 mm.

The device according to the invention is distinguished by at least one parallel spring on which at least one of the tools is movably supported transversely relative to the transport direction of the packaging sleeves. A parallel spring enables resilient support which enables parallel displacement of the supported component (in this instance: the tool). A parallel displacement has the advantage that the supported tool is not tilted or inclined which could impair the function of the tool. A parallel displacement may, for example, be achieved by means of two leaf springs which are arranged in parallel and which are bent in the event of a load. As a result of this support, a "passive" adaptation or adjustment of the gap—that is to say, brought about by the material to be processed—is achieved. This is comparable with the chassis of a motor vehicle in which the wheels are resiliently supported with respect to the bodywork in order to be able to compensate for occurrences of unevenness in the road. The tool which is supported on the parallel spring can thus "avoid" occurrences of unevenness of the material to be processed. Such a support system has specific advantages with tools which are directly in contact with the material to be processed and which, for example, roll on the material. This is, for example, the case with ultrasound welding installations in which there are used two tools which rotate in opposing directions (sonotrode/anvil) and which roll at both sides on the material to be welded. An advantage of the resilient support in this field of application is that even materials with changing thickness can be welded in a reliable manner, for example, packaging sleeves with one seam location. The resilient path of the parallel spring can be mechanically limited by a stop. This has the advantage that the tools which are supported on the parallel spring cannot come into contact with each other and are consequently protected. Alternatively, rollers, strips, cables, belts, guiding bars, pressing bars, chains or oscillation dampers can also be supported as tools on a parallel spring.

According to an embodiment of the device, there is provision for the parallel spring to comprise at least two leaf springs which are arranged parallel with each other. A production of the parallel spring using bending springs, in particular using leaf springs, is distinguished by a structurally simple and very robust structure. In addition, leaf springs and parallel springs which are produced therefrom have hygienic advantages since they can be readily cleaned as a result of their geometrically simple shape and can be operated without lubricant. Leaf springs can therefore also be used under hygienically demanding conditions, for example, in the sterile processing of foodstuff packagings. Another advantage of leaf springs is their comparatively low mass. This results in low inertia so that the parallel spring can be redirected in a very spontaneous manner. Preferably, the leaf springs are produced from metal, in particular from steel, such as, for instance, spring steel or high-grade steel, wherein high-grade steels comply particularly well with the high hygienic requirements. It is also possible to use, for example, more simple high-grade steel types, such as those in accordance with the material number 1.4301. The wall thickness of the leaf springs may vary in accordance with the other dimensions thereof and the required resilient paths. It may be, for example, in the region between 0.6 mm and 4.5 mm and preferably between 0.9 mm and 1.5 mm.

With regard to this embodiment, it is further proposed that the leaf springs of the parallel spring be spaced apart from each other by at least two spacer elements. As a result of the spacer elements, a constant spacing can be adjusted between the leaf springs and consequently a substantially parallel path of the leaf springs can be achieved. In addition, the spacer elements bring about a situation, in the event of compression or extension—in contrast to a layered "spring assembly"—in which there is no friction produced between the adjacent leaf springs. Preferably, each parallel spring has two spacer elements which are arranged in the region of the two ends of the leaf springs. In this instance, it is particularly advantageous, in order to take into account hygienic advantages and in order to comply with aseptic requirements, for the parallel spring arrangement to be produced in one piece. This means that leaf springs and spacer elements comprise a single component. This has the particular advantage that no capillaries can be formed between the otherwise individual components and consequently the risk of the formation of accumulations of germs is eliminated.

In another embodiment of the support, there is provision for the parallel spring to have in the transverse direction of the gap a stiffness in the range between 0.5 N/mm and 350 N/mm, in particular between 4.0 N/mm and 100 N/mm, quite particularly between 5.0 N/mm and 45 N/mm. When a tool is supported on a plurality of parallel springs—depending on the association of the parallel springs—the stiffness of an individual parallel spring may differ from the resulting overall stiffness. In this instance, the stiffness of the individual parallel springs is intended to be in the stated range. Resilient rigidities in this range have been found in particular in the processing of packaging sleeves of composite material to be a good compromise between an excessively soft support (disadvantage: excessively low pressing force) and excessively hard support (disadvantage: excessively poor compensation of fluctuations of the material thickness). The characteristic line of the parallel spring may extend in a linear, progressive or degressive manner. The desired path and the resulting configuration of the parallel springs are highly dependent on the structure of the material which is intended to be welded (laminate of the packaging sleeves or the packaging) and the geometry to be processed (layer step). Normally, it is possible to achieve good (sealing) results with a linear path of the characteristic line of the parallel spring. However, depending on the compressibility and the melting behaviour of the sealing layer of the material (laminate of the packaging sleeves or the packaging), a progressive or degressive characteristic line of the parallel spring may also be desired, wherein a sealing layer which in the processing temperature window already has a relatively high level of viscous behaviour should be processed with a parallel spring having a rather progressively configured characteristic line, whilst for a correspondingly low level of viscous behaviour, a configuration with a degressive characteristic line should instead be used.

Another configuration of the device makes provision for at least one of the tools to be supported on two or more parallel springs. The support on a plurality of parallel springs has the advantage that even tools with a relatively large mass can be supported on the parallel springs without the individual parallel spring having to be adapted for this purpose.

With respect to this configuration, it is further proposed that the parallel springs be connected to each other by means of a bridge. As a result of a rigid connection of the parallel springs to a bridge, it is possible for the force acting on the tool to be distributed over a plurality of parallel springs which are connected in parallel. In this manner, the advantage of a parallel spring of exclusively bending in the event of loads and not becoming twisted may be retained even with an arrangement of a plurality of parallel springs which are connected in parallel. In this instance, arrangements of from 2 to 20, in particular from 4 to 8 parallel springs, appear to be particularly advantageous. This has the advantage that the tool supported on the parallel springs performs a purely parallel displacement and does not assume a tilted or inclined position, and consequently can be positioned in a particularly precise manner. It may also be preferable for a plurality of parallel springs to be connected in series. It may also be preferable for series and parallel connections of parallel springs to be combined with each other. In this manner, the desired redirection behaviour of the tool can be complied with particularly well, wherein the advantage of the parallel springs of bending exclusively in the event of loads and not becoming twisted is retained even with a corresponding connection via one or more bridges. Preferably, the tool is secured to the bridge so that the bridge additionally performs the function of an adapter by means of which differently shaped tools can be supported on the parallel springs. There may be provision for the bridge to at the same time perform the function of the spacer elements between the leaf springs, whereby separate spacer elements can be dispensed with.

According to another embodiment of the device, there is provision for the parallel springs to extend in a vertical direction. Alternatively, there may be provision for the parallel springs to extend in a horizontal direction. A vertical path is intended to be understood to be a path in the vertical direction of the gap and a horizontal path is intended to be understood to be a path in the longitudinal direction of the gap (that is to say, in the transport direction). In both cases, there may be provision for the parallel spring to be clamped or movably guided at both ends. In this instance, the tool is preferably supported in the central region between the two ends on the parallel spring. Alternatively, there may be provision in both cases for the parallel spring to be clamped or movably guided only at one end and for the other end to be a free end. In this instance, the tool is preferably supported in the region of the free end on the parallel spring. As a result of the different arrangement variants produced in this manner, it is in particular readily possible to implement a substantially "torque-free" support of the tools.

In another embodiment of the device, there is provision for one of the tools to be a sonotrode. Preferably, the sonotrode, in particular the operating region of the sonotrode, is rotatably supported. Such sonotrodes are also referred to as "rolling sonotrodes" and have the advantage that they can roll on the materials which are intended to be welded and consequently can provide continuous welding of materials which are moving along. With regard to this embodiment, it is further proposed that the sonotrode be supported on the parallel spring. The support of the sonotrode on a parallel spring has the advantage that the sonotrode can spring back in the event of a change of the material thickness without being tilted or inclined in this instance. Therefore, the rotation axis of the sonotrode extends in every position substantially vertically; it is displaced only in a parallel manner. This has the advantage that the position and the shape of the weld seam also remains unchanged when the sonotrode has sprung back. The wall portions of the tools which form the gap thus also further remain constantly parallel with each other whilst only the gap width changes.

According to another embodiment of the device, there is provision for one of the tools to be an anvil. Preferably, the anvil, in particular the operating region of the anvil, is rotatably supported. Such anvils are also referred to as "rolling anvils" and have the advantage that they can roll on the materials which are intended to be welded and consequently can provide continuous welding of materials which are moving along. With regard to this embodiment, it is further proposed that the anvil be supported on the parallel spring. The support of the anvil on a parallel spring has the advantage that the anvil can spring back in the event of a change of the material thickness without being tilted or inclined in this instance. Therefore, the rotation axis of the anvil extends in every position substantially vertically; it is displaced only in a parallel manner. This has the advantage that the position and the shape of the weld seam also remains unchanged when the anvil has sprung back.

In another embodiment of the device, there is provision for the sonotrode and the anvil to have rotation axes which are arranged parallel with each other. As a result of the parallel arrangement of the rotation axes, it is also possible to produce reliable weld seams using geometrically simply shaped operating faces, for example, cylindrical operating faces. In addition, parallel rotation axes simplify the driving of the sonotrode and the anvil via toothed wheels or belts.

The device may finally be supplemented by a conveyor belt having cells for receiving the packaging sleeves. As a result of a conveyor belt or a transport belt, there can be transmitted high tensile forces which enable a large number of packaging sleeves to be transported with constant spacing with respect to each other. The cells serve to receive the packaging sleeves. The packaging sleeves may be retained in the cells both by means of a positive-locking connection and by means of a non-positive-locking connection.

The device described above is particularly suitable in all the embodiments illustrated for use for processing, in particular for welding, of packagings for foodstuffs. This is in particular a result of the fact that the parallel springs used in the device have hygienic advantages since they can be readily cleaned as a result of the geometrically simple shape thereof and can be operated without lubricant. Parallel springs can therefore also be used under hygienically demanding conditions, for example, in the sterile processing of foodstuff packagings.

BRIEF DESCRIPTION OF THE DRAWINGS

The invention is explained in greater detail below with reference to a drawing which illustrates only a preferred embodiment. In the drawings:

FIG. 3 is a side view of the device from FIG. 2 in the plane of section III-III in FIG. 2, and FIG. 4 is a front view of the device from FIG. 2 in the plane of section IV-IV from FIG. 3.

DESCRIPTION OF THE INVENTION

Figure 1A:
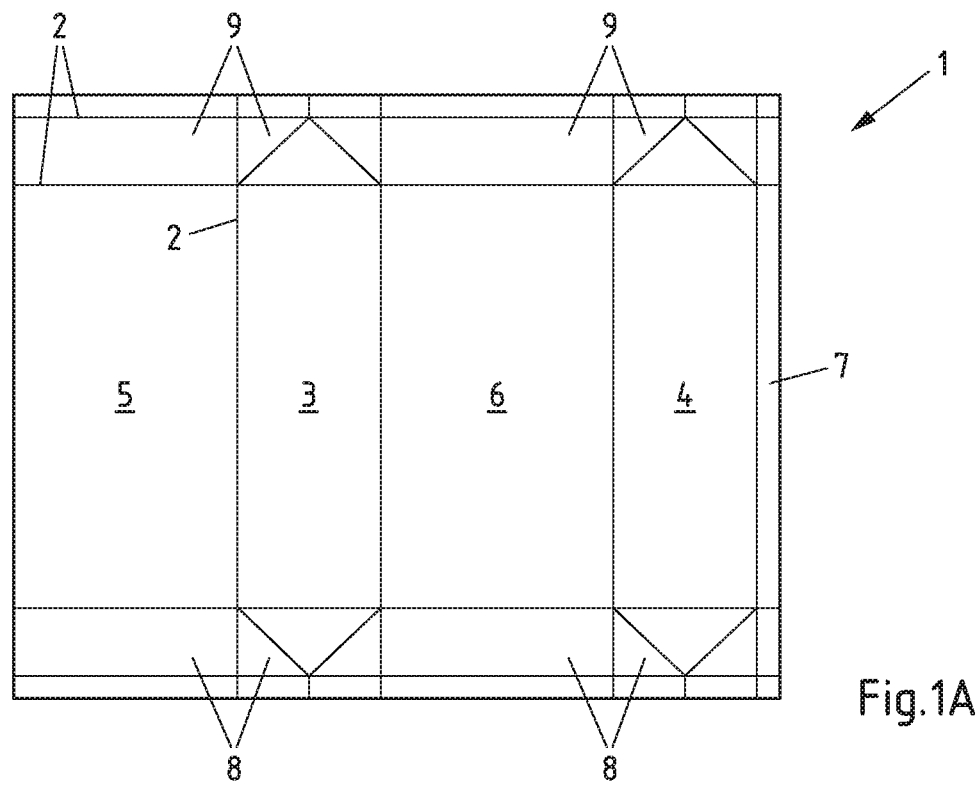
FIG. 1A shows a blank known from the prior art for folding a packaging sleeve.

FIG. 1A illustrates a blank 1 which is known from the prior art and from which a packaging sleeve can be formed. The blank 1 may comprise a plurality of layers of different materials, for example, paper, cardboard, plastics material or metal, in particular aluminium. The blank 1 has a plurality of folding lines 2 which are intended to facilitate the folding of the blank 1 and which divide the blank 1 into a plurality of faces. The blank 1 may be subdivided into a first side face 3, a second side face 4, a front face 5, a rear face 6, a sealing face 7, base faces 8 and gable faces 9. From the blank 1, a packaging sleeve can be formed by the blank 1 being folded in such a manner that the sealing face 7 can be connected to the front face 5, in particular welded.

Figure 1B:
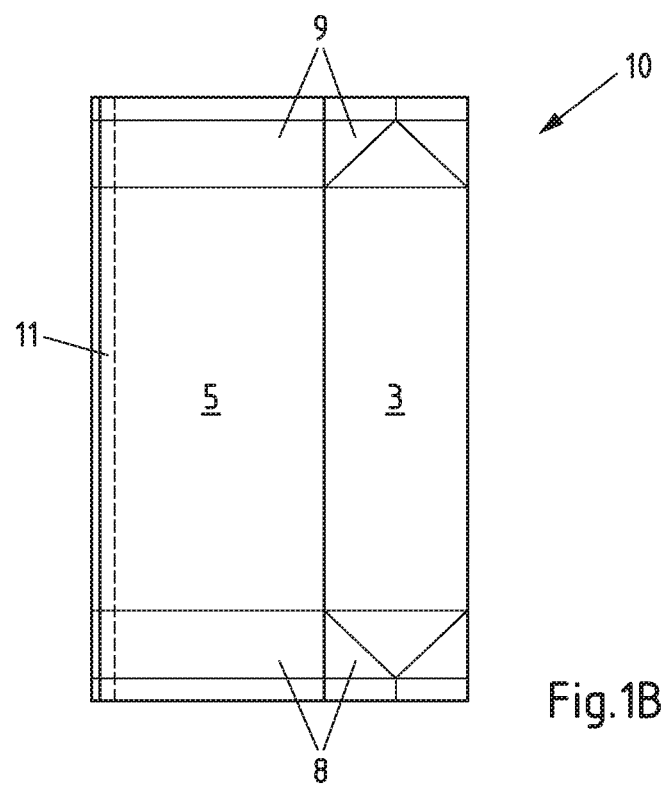
FIG. 1B shows a packaging sleeve which is known from the prior art and which is formed from the blank shown in FIG. 1A, in the state folded flat.

FIG. 1B shows a packaging sleeve 10 known from the prior art in the state folded flat. The regions of the packaging sleeve already described in connection with FIG. 1A are indicated in FIG. 1B with corresponding reference numerals. The packaging sleeve 10 is formed from the blank 1 shown in FIG. 1A. To this end, the blank 1 was folded in such a manner that the sealing face 7 and the front face 5 are arranged so as to overlap so that the two faces can be welded to each other in a planar manner. Consequently, a longitudinal seam 11 is produced. In FIG. 1B, the packaging sleeve 10 is illustrated in a state folded flat. In this state, a side face 4 (concealed in FIG. 1B) is located below the front face 5 whilst the other side face 3 is located on the rear face 6 (concealed in FIG. 1B). In the state folded flat, a plurality of packaging sleeves 10 can be stacked in a particularly space-saving manner. Therefore, the packaging sleeves 10 are often stacked at the location of production and transported in stacks to the location of filling. Only there are the packaging sleeves 10 unstacked and folded open in order to be able to be filled with contents, for example, with foodstuffs.

Figure 1C:
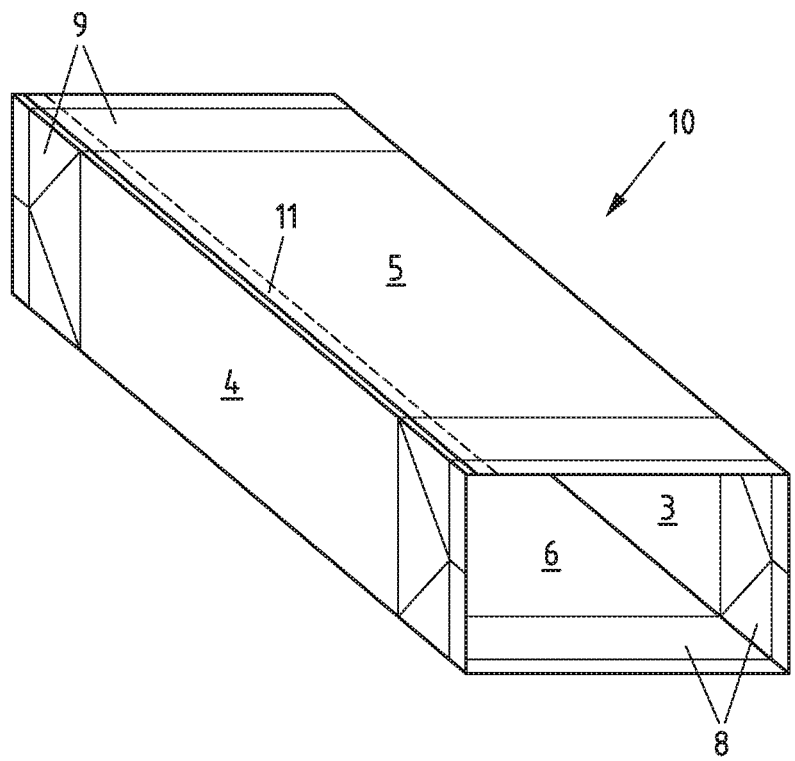
FIG. 1C shows the packaging sleeve from FIG. 1B in the state folded open.

In FIG. 1C, the packaging sleeve 10 from FIG. 1B is illustrated in the state folded open. In this instance, the regions of the packaging sleeve 10 already described in connection with FIG. 1A or FIG. 1B are also indicated with corresponding reference numerals. The state folded open is intended to be understood to be a configuration in which an angle of approximately 90° is formed between the two adjacent faces 3, 4, 5, 6, respectively, so that the packaging sleeve 10—depending on the shape of these faces—has a square or rectangular cross-section. Accordingly, the opposing side faces 3, 4 are arranged parallel with each other. The same applies to the front face 5 and the rear face 6.

Figure 1D:
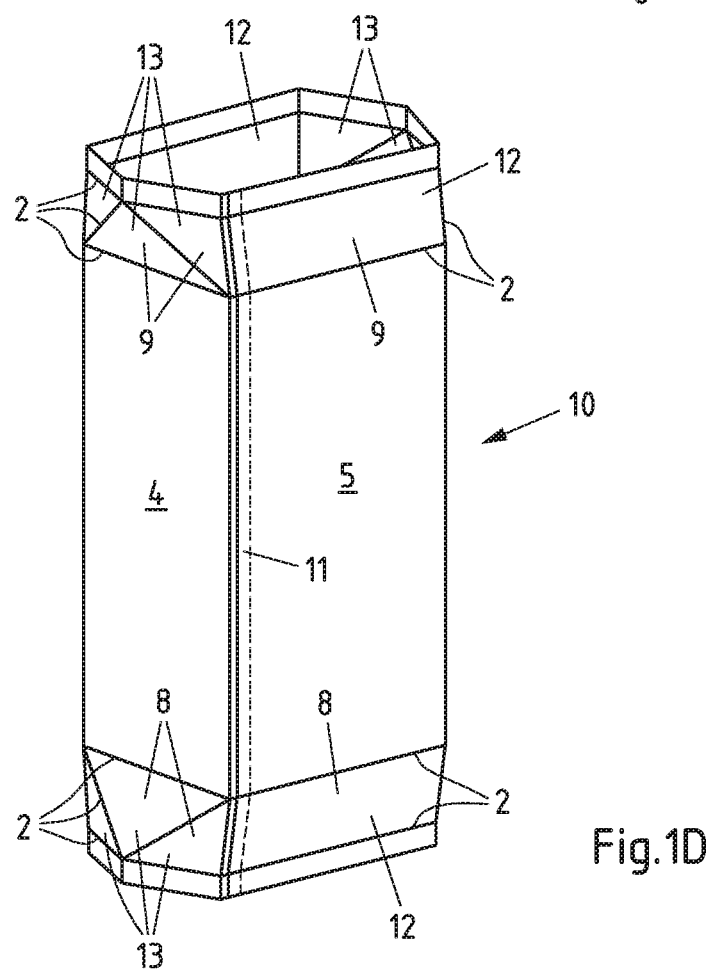
FIG. 1D shows the packaging sleeve from FIG. 1C with pre-folded base and gable faces.

FIG. 1D shows the packaging sleeve 10 from FIG. 1C in the pre-folded state, that is to say, in a state in which the fold lines 2 both in the region of the base faces 8 and in the region of the gable faces 9 have been pre-folded. Those regions of the base faces 8 and the gable faces 9 which adjoin the front face 5 and the rear face 6 are also referred to as rectangular faces 12. The rectangular faces 12 are folded inwards during the pre-folding operation and subsequently form the base or the gable of the packaging. Those regions of the base faces 8 and the gable faces 9 which adjoin the side faces 3, 4 are in contrast referred to as triangular faces 13. The triangular faces 13 are folded outwards during the pre-folding operation and form protruding regions of excess material which are also referred to as "lugs" 14 and in a subsequent production step—for instance, by means of adhesive methods—are placed on the packaging.

Figure 1E:
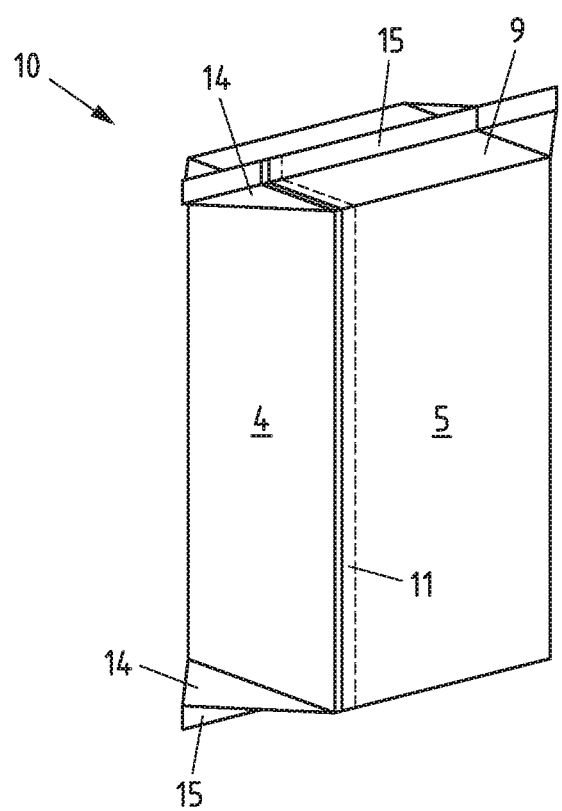
FIG. 1E shows the packaging sleeve from FIG. 1C after welding.

In FIG. 1E, the packaging sleeve 10 from FIG. 1D is shown after the welding operation, that is to say, in the filled and closed state. In the region of the base faces 8 and in the region of the gable faces 9, a fin seam 15 is produced after the closure. In FIG. 1E, the lugs 14 and the fin seam 15 protrude. Both the lugs 14 and the fin seam 15 are placed in a subsequent production step, for instance, by means of adhesive methods.

Figure 1F:
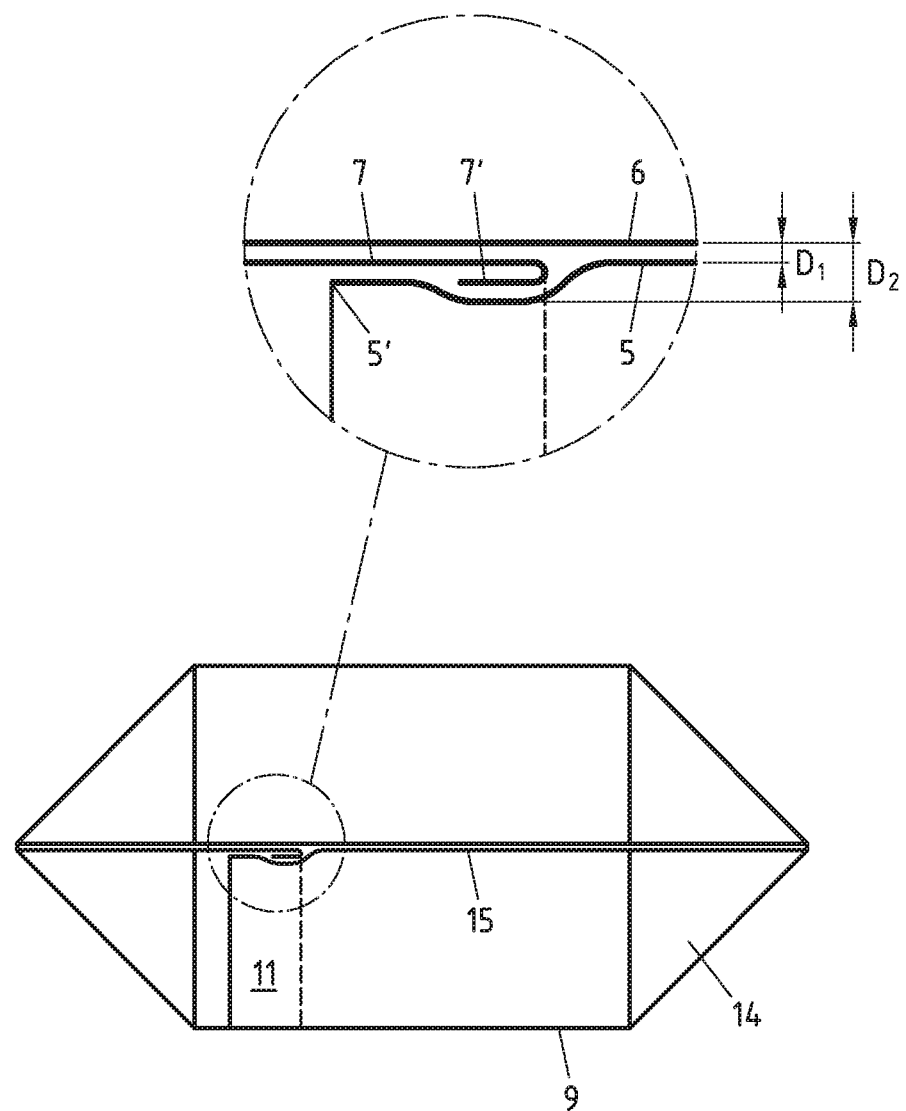
FIG. 1F is a plan view of the packaging sleeve from FIG. 1E.

FIG. 1F is a plan view of the packaging sleeve 10 from FIG. 1E. FIG. 1F additionally contains an enlarged view of the region of the longitudinal seam 11. In the perspective view illustrated, it can be seen that the fin seam 15 of the packaging sleeve 10 in the region of the longitudinal seam 11 has a thickness $D_2$ which is greater than the thickness $D_1$ in the remaining region of the fin seam 15. This is a result of the fact that the end region 5' of the front face 5 and the end region 7' of the sealing face 7 form an overlap in the region of the longitudinal seam 11. In the region of the longitudinal seam 11, the fin seam 15 thus has an at least three-layered structure in place of a two-layered structure. The thickness $D_1$ of the fin seam 15 is, for example, in the range between 0.8 mm and 1.0 mm, whilst the increased thickness $D_2$ of the fin seam 15 is, for example, in the range between 1.2 mm and 1.5 mm. The transition between the different thicknesses is also referred to as a "layer step". In addition to the overlapping, one or both end regions 5', 7' can be folded over. A folding-over of the inner end region (in FIG. 1F: end region 7') has the advantage that only the innermost layer of the material of the blank 1 can come into contact with the content of the packaging. This results in other layers of the material of the blank 1, for example, a central layer of cardboard, being separated from the content of the packaging. In this manner, both the sealing of the packaging and hygienic requirements are ensured. A complete folding-over of the inner end region 7' would, however, lead to a further increase of the thickness of the fin seam 15. There may therefore be provision for only a few layers of the end region 7', in particular the innermost layer of the end region 7', to be folded over. To this end, the remaining layers are separated or peeled away before the folding-over operation.

Figure 2:
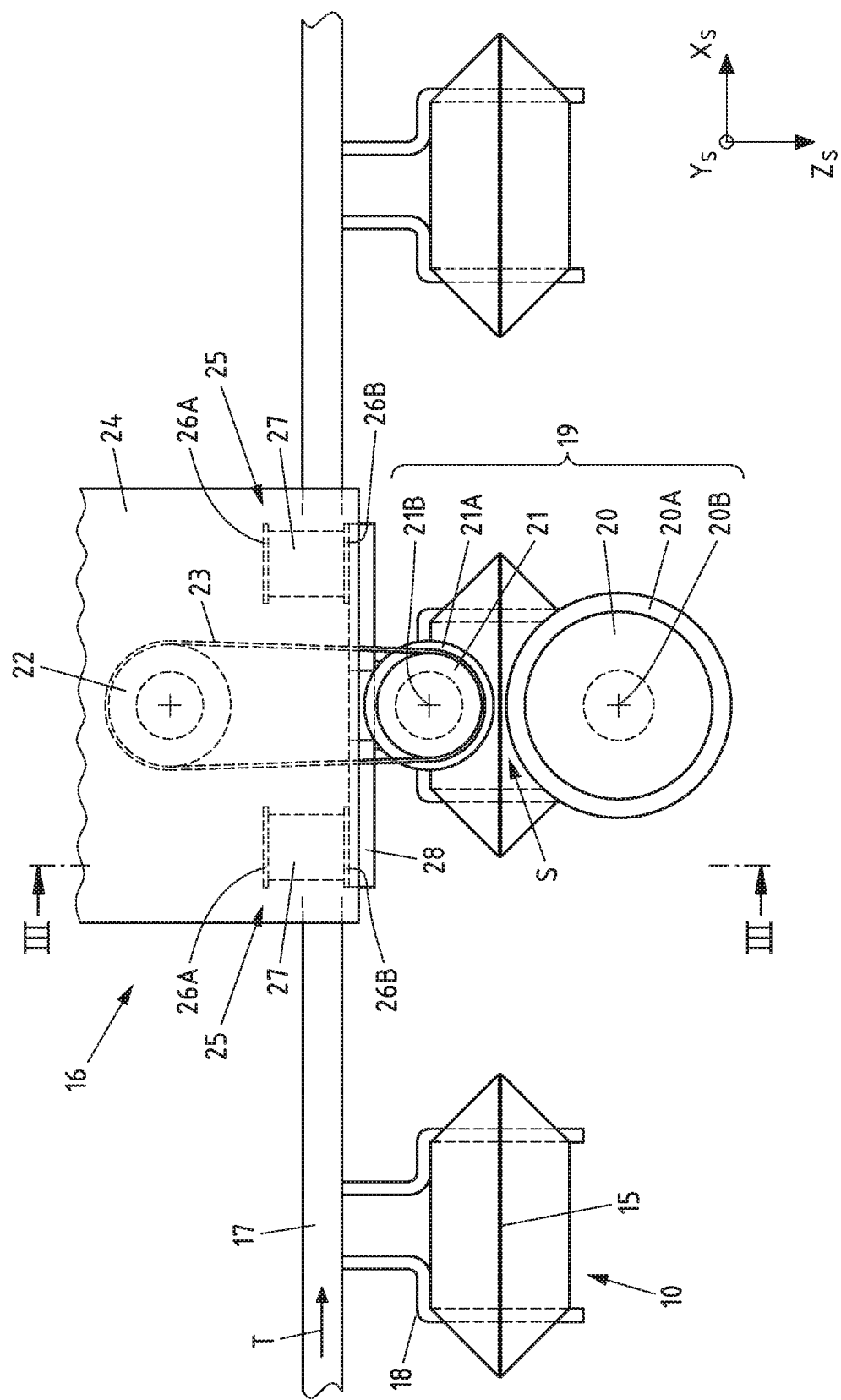
FIG. 2 is a plan view of a device according to the invention for ultrasound welding of packaging sleeves.

FIG. 2 is a plan view of a device 16 according to the invention for ultrasound welding of packaging sleeves 10. There is further illustrated a conveyor belt 17 with cells 18 in which the packaging sleeves 10 are first guided to the device 16 and are further transported after the welding operation. The transport direction T of the packaging sleeves 10 therefore extends parallel with the conveyor belt 17. The device 16 comprises two tools 19 for ultrasound welding of the packaging sleeves 10, wherein, in the device 16 which is illustrated in FIG. 2 and which is preferred in this regard, one tool is a sonotrode 20 and the other tool is an anvil 21. However, other tools 19—not illustrated in FIG. 2—can also be used. The sonotrode 20 has an operating region 20A with a round cross-sectional surface-area and the anvil 21 has a round operating region 21A with a cross-sectional surface-area which is also round.

The sonotrode 20 and the anvil 21 are supported in such a manner that there is produced between the operating regions 20A, 21A a gap S whose longitudinal direction $X_s$ corresponds to the transport direction T of the packaging sleeves 10. The gap S additionally has a vertical direction $Y_S$ and a transverse direction $Z_s$ which extend perpendicularly relative to each other and perpendicularly relative to the longitudinal direction $X_S$ of the gap S (see coordinate system in FIG. 2). The sonotrode 20 is rotatably supported about a rotation axis 20B and the anvil 21 is rotatably supported about a rotation axis 21B. The two rotation axes 20B, 21B are arranged parallel with each other and extend in the vertical direction $Y_s$ of the gap S (that is to say, "vertically"). The sonotrode 20 has an internal drive (which is therefore not visible in FIG. 2), whilst the anvil 21 has an external drive 22 which drives the anvil 21 via a belt 23.

In the device 16 illustrated in FIG. 2, the packaging sleeves 10 are guided with their protruding fin seam 15 in the transport direction T through the gap S, wherein the operating regions 20A, 21A touch the regions of the packaging sleeves 10 which are intended to be welded (in this instance: the fin seam 15) and weld them to each other. In order in spite of the different thicknesses $D_1$, $D_2$ of the fin seam 15 to achieve a uniform pressing force and consequently reliable welding, the anvil 21 is supported on a base plate 24 in such a manner that the size of the gap S can be changed in the transverse direction $Z_s$. The support of the anvil 21 is carried out in the device 16 illustrated by way of example in FIG. 2 by means of two parallel springs 25 which each comprise two leaf springs 26A, 26B which are arranged parallel with each other. The leaf springs 26A, 26B of the two parallel springs 25 extend in a vertical direction and are spaced apart from each other by means of two spacer elements 27. The two parallel springs 25 are connected to each other by means of a bridge 28 to which the anvil 21 is secured. As a result of the resilient support of the anvil 21, the anvil 21 can extend depending on the thickness of the fin seam 15 (increase of the gap S) or become compressed (reduction of the gap S) so that the operating region 21A of the anvil 21 acts on the fin seam 15 with a pressing force which is as constant as possible.

In FIG. 3, the device 16 from FIG. 2 is illustrated as a side view in the plane of section III-III from FIG. 2. For those regions of the device 16 which have already been described in connection with FIG. 2, corresponding reference numerals are used in FIG. 3. In the side view, the support of the anvil 21 on the two vertically extending parallel springs 25 can be seen particularly clearly. In the embodiment of the device 16 illustrated in FIG. 3 and preferred in this regard, the leaf springs 26A, 26B of the parallel spring 25 extend in the vertical direction $Y_s$ of the gap S and consequently in a vertical direction. The parallel spring 25 is secured with the upper end thereof to the base plate 24, whilst the lower end of the parallel spring 25 is a free end. As an alternative to the configuration illustrated in FIG. 3, the leaf springs 26A, 26B of the parallel spring 25 could also extend in the longitudinal direction $X_s$ of the gap S and consequently in a horizontal direction. As a result of the parallel path of the leaf springs 26A, 26B, the anvil 21 is displaced in a parallel manner in the event of extension and compression in the transverse direction $Z_s$ of the gap S, without being tilted. The rotation axis 21B of the anvil 21 is thus intended in every position of the anvil 21 to extend in the vertical direction $Y_s$ of the gap S and consequently vertically. In a tilted position of the anvil 21 and/or the sonotrode 20—prevented by the invention—there is the disadvantage that the operating regions 20A, 20B act on the fin seam 15 only with the edge thereof, whereby the quality of the welding decreases or the fin seam 15 is even cut. In contrast, as a result of the parallel spring 25, a "parallel displacement" of the anvil 21 in the transverse direction $Z_s$ of the gap S is enabled, which avoids the disadvantages described above.

FIG. 4 is a front view of the device 16 from FIG. 2 in the plane of section IV-IV from FIG. 3. For those regions of the device 16 which have already been described in connection with FIG. 2 or FIG. 3, corresponding reference numerals are used in FIG. 4. For reasons of greater clarity, the plane of section IV-IV is selected in such a manner that the sonotrode 20 cannot be seen in FIG. 4. In the front view, it can clearly be seen that the anvil 21 is supported on the bridge 28 centrally between both vertically extending parallel springs 25. To this end, connection elements 29, for example, screws may be provided. As a result of the bridge 28, the forces during extension and compression of the anvil 21 are transmitted in a uniform manner to both parallel springs 25. This has the advantage that the leaf springs 26A, 26B of the two parallel springs 25 are subjected only to a bending load and not a torsion load. This also ensures a "parallel displacement" of the anvil 21 and prevents the anvil 21 from assuming a tilted position. The rotation axis 21B of the anvil 21 is thus intended to extend in each position in the vertical direction $Y_s$ of the gap S and consequently vertically.

LIST OF REFERENCE NUMERALS

1: Blank
2: Folding line
3, 4: Side faces
5: Front face
5': End region (of the front face 5)
6: Rear face
7: Sealing face
7' End region (of the sealing face 7)
8: Base face
9: Gable face
10: Packaging sleeve
11: Longitudinal seam
12: Rectangular face
13: Triangular face
14: Lug
15: Fin seam
16: Device for ultrasound welding
17: Conveyor belt
18: Cell
19: Tool
20: Sonotrode/Rolling sonotrode
20A: Operating region (of the sonotrode 20)
20B: Rotation axis (of the sonotrode 20)
21: Anvil/Rolling anvil
21A: Operating region (of the anvil 21)
21B: Rotation axis (of the anvil 21)
22: Drive (of the anvil 21)
23: Belt
24: Base plate
25: Parallel spring
26A, 26B: Leaf spring
27: Spacer element
28: Bridge 29: Connection elements
D$_1$: Thickness (of the fin seam 15)
D$_2$: Increased thickness (of the fin seam 15)
S: Gap
T: Transport direction (of the packaging sleeve 10)
X$_s$: Longitudinal direction (of the gap S)
Y$_s$: Vertical direction (of the gap S)
Z$_s$: Transverse direction (of the gap S)

The invention claimed is:

1. A device for processing of packaging sleeves or packagings, comprising:
   at least two tools for processing of packaging sleeves, and
   at least one parallel spring on which at least one of the tools is movably supported transversely relative to a transport direction of the packaging sleeves, the at least one parallel spring comprising at least two leaf springs which are arranged parallel with each other,
   wherein each tool has an operating region,
   wherein the tools are supported in such a manner that there is produced between the operating regions a gap whose longitudinal direction corresponds to the transport direction of the packaging sleeves, and
   wherein the tools are supported in such a manner that the size of the gap can be changed,
   wherein one of the tools is a sonotrode,
   wherein one of the tools is an anvil, and
   wherein the sonotrode and the anvil have rotation axes which are arranged parallel with each other,
   further comprising a conveyor belt having cells for receiving the packaging sleeves.

2. The device according to claim 1, wherein the leaf springs of the at least one parallel spring are spaced apart from each other by at least two spacer elements.

3. The device according to claim 1, wherein the at least one parallel spring has in a transverse direction of the gap a stiffness in the range between 0.5 N/mm and 350 N/mm.

4. The device according to claim 1, wherein the at least one parallel spring comprises two or more parallel springs, and wherein at least one of the tools is supported on two or more of the parallel springs.

5. The device according to claim 4, wherein the parallel springs are connected to each other by means of a bridge.

6. The device according to claim 1, wherein the at least one parallel spring extends in the vertical direction of the gap.

7. The device according to claim 1, wherein the at least one parallel spring extends in the horizontal direction of the gap.

8. The device according to claim 1, wherein the sonotrode is supported on the at least one parallel spring.

9. The device according to claim 1, wherein the anvil is supported on the at least one parallel spring.

10. A method for processing of packaging sleeves or packagings with the device of claim 1, the method comprising:
    inserting a packaging sleeve into a cell of the conveyor;
    guiding the packaging sleeve to the at least two tools; and
    processing the packaging sleeve with the at least two tools.

11. The method according to claim 10, wherein processing the packaging sleeve comprises welding the packaging sleeve.

12. The method according to claim 10, wherein the packaging sleeve is configured to receive foodstuffs.

13. The device according to claim 1, wherein the at least two tools are configured for ultrasound welding of the packaging sleeve.

14. The device according to claim 3, wherein the at least one parallel spring has in the transverse direction of the gap a stiffness in the range between 4.0 N/mm and 100 N/mm.

15. The device according to claim 3, wherein the at least one parallel spring has in the transverse direction of the gap a stiffness in the range between 5.0 N/mm and 45 N/mm.

* * * * *